United States Patent

Schwede

[11] Patent Number: 5,276,900
[45] Date of Patent: Jan. 4, 1994

[54] MASTER CONNECTED TO COMMON BUS PROVIDING SYNCHRONOUS, CONTIGUOUS TIME PERIODS HAVING AN INSTRUCTION FOLLOWED BY DATA FROM DIFFERENT TIME PERIOD NOT IMMEDIATELY CONTIGUOUS THERETO

[75] Inventor: Gary W. Schwede, Palo Alto, Calif.

[73] Assignee: Stream Computers, Palo Alto, Calif.

[21] Appl. No.: 627,639

[22] Filed: Dec. 14, 1990

[51] Int. Cl.$^5$ .................. G06F 13/42; G06F 13/38; G06F 13/00

[52] U.S. Cl. .................. 395/800; 395/275; 395/550; 364/132; 364/942; 364/942.1; 364/942.4; 364/950.3; 364/DIG. 2; 364/230.4; 364/238; 364/239.5; 340/825.08; 370/61

[58] Field of Search ............... 395/800, 200, 275, 325, 395/550; 364/132; 370/61; 340/825.08

[56] References Cited

U.S. PATENT DOCUMENTS

| | | | |
|---|---|---|---|
| 3,596,256 | 7/1971 | Alpert et al. | 395/275 |
| 4,096,566 | 6/1978 | Borie et al. | 395/325 |
| 4,219,873 | 8/1980 | Kober et al. | 395/650 |
| 4,236,203 | 11/1980 | Curley et al. | 395/325 |
| 4,414,624 | 11/1983 | Summer, Jr. et al. | 395/650 |
| 4,434,421 | 2/1984 | Baker et al. | 340/825.51 |
| 4,443,861 | 4/1984 | Slater | 395/275 |
| 4,481,572 | 11/1984 | Ochsner | 395/325 |
| 4,494,192 | 1/1985 | Lew et al. | 395/325 |
| 4,543,626 | 9/1985 | Bean et al. | 395/200 |
| 4,574,345 | 3/1986 | Konesky | 395/325 |
| 4,591,976 | 5/1986 | Webber et al. | 395/575 |
| 4,642,758 | 2/1987 | Teng | 395/600 |
| 4,688,171 | 8/1987 | Selim et al. | 395/200 |
| 4,750,115 | 6/1988 | Sekiya et al. | 395/200 |
| 4,807,121 | 2/1989 | Halford | 395/275 |
| 4,814,984 | 3/1989 | Thompson | 395/200 |
| 4,845,667 | 7/1989 | Hoptner et al. | 364/424.01 |
| 4,847,756 | 7/1989 | Ito et al. | 395/200 |
| 4,862,350 | 8/1989 | Orr et al. | 395/250 |
| 4,872,125 | 10/1989 | Catlin | 364/578 |
| 4,873,656 | 10/1989 | Catlin | 364/578 |
| 4,907,146 | 3/1990 | Caporali | 364/132 |
| 4,910,705 | 3/1990 | Boioli et al. | 395/325 |
| 4,912,633 | 3/1990 | Schweizer et al. | 395/800 |
| 4,918,589 | 4/1990 | Floro et al. | 364/132 |
| 4,918,596 | 4/1990 | Nakano | 395/650 |
| 4,930,069 | 5/1990 | Batra et al. | 395/275 |
| 4,935,866 | 6/1990 | Sauvajol et al. | 395/325 |
| 5,036,453 | 7/1991 | Renner et al. | 395/800 |

FOREIGN PATENT DOCUMENTS 0341710 11/1989 European Pat. Off. .

Primary Examiner—Thomas C. Lee
Assistant Examiner—Paul Harrity
Attorney, Agent, or Firm—Limbach & Limbach

[57] ABSTRACT

In the present invention a digital communication controller for interfacing with a master processor and a synchronous bus having a plurality of slave processors connected thereto is disclosed. The digital communication controller provides synchronous transfer of instruction and data in each microcycle to the bus. However, the data provided in each microcycle is multiplexed such that it is associated with the instruction transmitted previously but not contiguous in time therewith.

21 Claims, 3 Drawing Sheets

MASTER CONNECTED TO COMMON BUS PROVIDING SYNCHRONOUS, CONTIGUOUS TIME PERIODS HAVING AN INSTRUCTION FOLLOWED BY DATA FROM DIFFERENT TIME PERIOD NOT IMMEDIATELY CONTIGUOUS THERETO

TECHNICAL FIELD

The present invention relates to a method and an apparatus for effecting digital communication between a master processor and a communication bus having a plurality of slave processors connected thereto. More particularly, the present invention relates to a digital communication controller which interfaces with the master processor and which receives a plurality of instructions and which provides instructions and, optionally, data to the communication bus.

BACKGROUND OF THE INVENTION

In the field of multiprocessor communications, two problems have usually arisen. First, there is the problem of interprocessor communication. Secondly, there is the problem of synchronization of operations among the processors so that each processor operates on an up-to-date and coherent set of input data.

One prior art solution, having high bandwidth communication, is a crossbar switch, directly connecting each processor's local memory with that of every other processor. This is known as a "fully connected" multiprocessor. However, the cost of a full crossbar switch grows as the square of the number of processors. Thus, it is not often implemented in practice.

Other prior art solutions are found by reference to U.S. Pat. Nos. 4,096,566; 4,443,861; 4,494,192; 4,574,345; 4,688,171; 4,814,984; 4,847,756; 4,862,350; 4,872,125; 4,873,656; 4,907,146; 4,910,705; 4,912,633; 4,918,589; 4,918,596; 4,930,069; 4,935,866; and 4,459,655.

In some applications, for example, in multichannel digital signal processing, prior art techniques have made use of simplified versions of the general multiprocessor communication and synchronization problems. When input signals are sampled in time at a fixed rate of $1/T_s$, operations can often be preformed repetitively as each new input data vector is ready, rather than in a longer or less-structured sequence. Communication among multiprocessors (or input/output units or storage units) can sometimes be limited to a modest number of streams of data which appear and are consumed at the same fixed sampling rate $1/T_s$. These streams flow between certain modules in a pattern Which is known in advance. Thus, a fully-connected multiprocessor system is not necessary.

In such an application, a common communication bus having a cycle time of $T_b \leq T_s/N$ can be time multiplexed, where N is the total number of time slots. Each separate stream of data is assigned a time slot $T_b$ seconds within a fixed sequence of N slots $\leq T_s$ seconds long. This prior art technique is often referred to as time-domain-multiplexing (TDM). In prior art TDM communication, the communication bus or channel carries data only, because the order of time slots has been prearranged.

The efficiency of TDM involves a limitation: the connectivity of the data flow must be changed by reassigning time slots using a mechanism separate and apart from the TDM channel itself, e.g., changing a ROM or a logic decoder in each processor or module, or reprogramming the processors via other channels.

Furthermore, the ratio of sampling interval to channel cycling time is the upper limit on the number of slots available. This limits the number of different streams of data that can be communicated.

A further difficulty with TDM as a means of interprocessor communication is the existence of simultaneous multiple rates of operation. For example, decimation algorithms produce results at multiples of $T_s$. Block-oriented algorithms, such as Fast Fourier Transforms, demand and produce data in block intervals long compared to $T_s$. Finally, human-controlled parameters may change slowly compared to these or other signals, with potentially many such human-controlled parameters. In the prior art TDM channel communication, these different sampling rates have not been accommodated in a single communications channel.

SUMMARY OF THE INVENTION

Therefore, in accordance with the present invention, a digital communication controller provides a plurality of instructions to a communication bus which has a plurality of slave processors connected thereto. The controller further comprises means for providing the instruction and directing the exchange of data synchronously in contiguous time periods (hereinafter "microcycles") with each instruction followed by data, on the bus. Further, the controller comprises means for multiplexing the instruction and the data transfers wherein each instruction is followed by data associated with the instruction previously transmitted, but not immediately contiguous in time thereto.

DETAILED DESCRIPTION OF THE DRAWINGS

Figure 1:
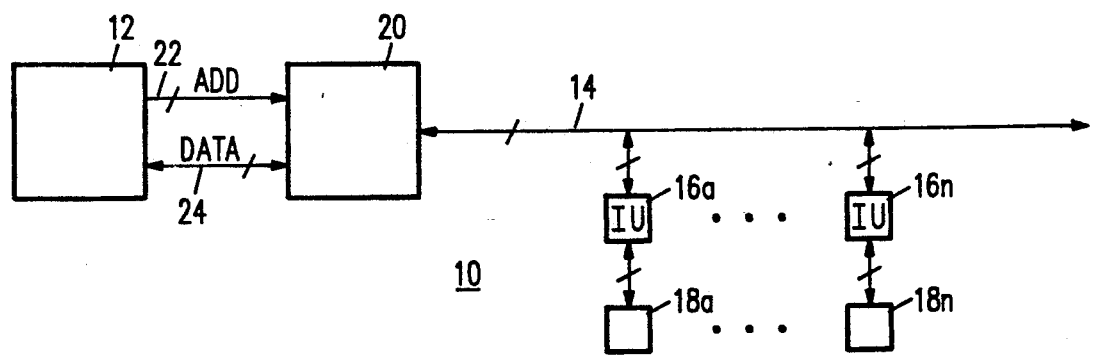
FIG. 1 is a schematic block diagram of a digital communication system incorporating the controller of the present invention interfacing with a master processor and with a communication bus having a plurality of slave processors connected thereto, with each slave processor connected to the communication bus through an interface unit.

Referring to FIG. 1, there is shown a block level diagram of a signal processing system 10 incorporating a digital communication controller 20 of the present invention. The digital communication controller 20 is connected to a master processor 12, which is a standard, general purpose computer or work station. In one preferred embodiment, the master processor 12 is an Apple MacIntosh II. The master processor 12 provides the interface to the user and generates the requisite instruction sequences which control the signal processing system 10.

The digital communication controller 20 also interfaces with a synchronized communication bus 14. A plurality of slave processors 18 ($a \ldots n$) are connected to the communication bus 14, with each slave processor 18 connected to the bus 14 through an associated interface unit 16. Thus, for each slave processor 18, there is an associated interface unit 16, which provides the communication and interfaces between the bus 14 and the slave processor 18.

In the preferred embodiment, the signal processing system 10 is a digital signal processing system operating on audio data. In the preferred embodiment, the audio signal is sampled at approximately 50 KHz, thereby generating an audio sample approximately every 20 microseconds. As used hereinafter, each sample period will be referred to as a "macrocycle". Within each macrocycle, the bus 14 is synchronized to transfer both an instruction phase and a data phase, alternating, every 100 nanoseconds (with each such combination of instruction phase and data phase referred to hereinafter as a "microcycle"). Thus, there are approximately 200 microcycles for each macrocycle. Each instruction phase and data phase is equal in time and is approximately 50 nanoseconds in duration.

In the preferred embodiment, the controller 20 provides the instructions supplied to it from the master processor 12, with the instruction directing the flow or exchange of data synchronously on the bus 14. Instructions supplied to the bus are provided only by the controller 20. However, the data which is associated with an instruction may be from either the controller 20, or any of the interface units 16. Each Macrocycle (M) has the following format:

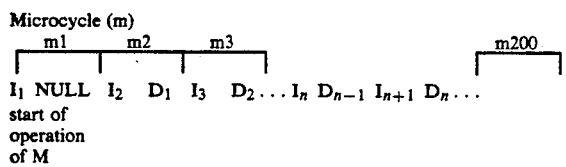

The controller 20 provides instructions and directs the flow of data synchronously in contiguous time periods with each instruction followed by data. However, each instruction is followed by data which is associated with the instruction previously transmitted, but not immediately contiguous in time thereto. Thus, there is a delay between providing an instruction $I_n$ and its associated data $D_n$, with another instruction $I_{n+1}$ and data $D_{n-1}$ interspersed in between.

Although the data is present on the bus 14, the data need not be from the master processor 12 or the controller 20. The data can be from any source, including any of the interface units 16.

Figure 2:
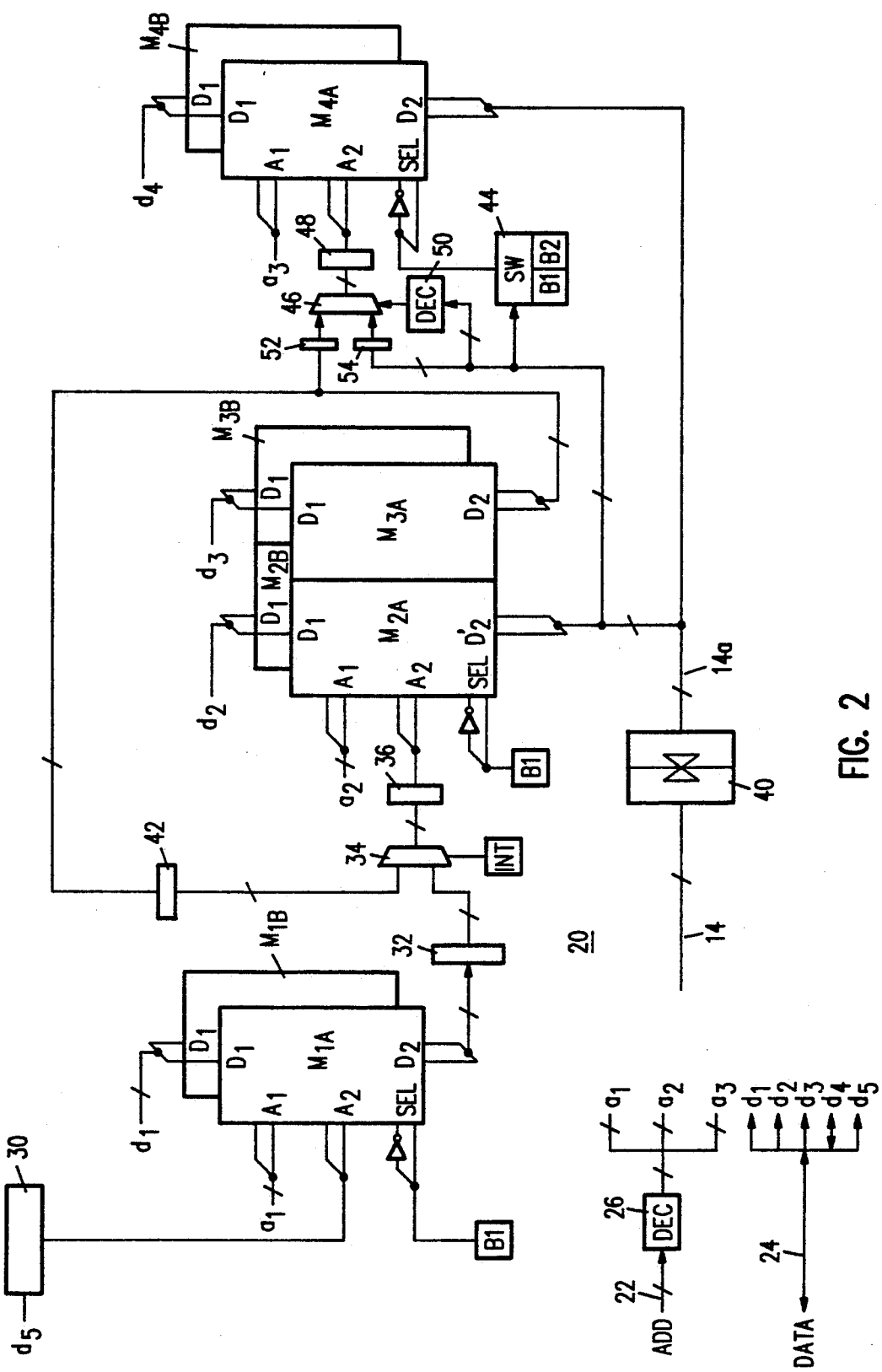
FIG. 2 is a detailed schematic block diagram of the controller of the present invention shown in FIG. 1.

Referring to FIG. 2, there is shown a detailed schematic block level diagram of the controller 20 of the present invention. The controller 20 receives address signals along an address bus 22 and data signals along a data bus 24 from the master processor 12. A decoder 26 decodes the address signals along the address bus 22 and provides three address bus signals: $a_1$, $a_2$ and $a_3$, to various portions of the controller 20. The data signals from the data bus 24 are divided into five data busses: $d_1$, $d_2$, $d_3$, $d_4$ and $d_5$, which are supplied to various portions of the controller 20.

The controller 20 comprises a macrocycle counter 30. The counter 30 is cleared upon start-up and is incremented automatically thereafter upon the start of a new macrocycle. Alternatively, data signal on the bus $d_5$ can be used to load the counter 30. The output of the macrocycle counter 30 is supplied to a dual bank dispatch table memory $M_{1A}$ and $M_{1B}$. Each of the dual bank dispatch table memories $M_{1A}$ and $M_{1B}$ is dual ported. Thus, dispatch table memory $M_{1A}$ has a first port (labelled $A_1$ and $D_1$, for address and data respectively) and a second port labelled $A_2$ and $D_2$, for address and data respectively). As used hereinafter, $A_1$ and $D_1$ will be used to refer to the address and data ports for one of the ports of a dual port memory, with $A_2$ and $D_2$ designating the address and data ports for the other port.

Address bus $a_1$ and data bus $b_1$ from the master processor 12 are supplied to the ports $A_1$ and $D_1$, respectively of the memories $M_{1A}$ and $M_{1B}$.

The output of the macrocycle counter 30 is supplied to the address port $A_2$ of both memories $M_{1A}$ and $M_{1B}$. The data output along the port $D_2$, from both memories $M_{1A}$ and $M_{1B}$, is supplied to a register 32. The choice of the selection of the output from the port $D_2$ from either dispatch table memory $M_{1A}$ or $M_{1B}$ is switched by a first bank switch $B_1$. In one position of the first bank switch $B_1$, port $D_2$ of bank $M_{1A}$ is selected. In the other position, port $D_2$ of bank $M_{1B}$ is selected. The output of the register 32 is supplied to a multiplexer 34. Multiplexer 34 has two inputs thereto. As will be seen, it is switched momentarily, when the macrocycle counter 30 is incremented signifying the commencement of a new macrocycle.

From the multiplexer 34, the data is supplied to a register 36. The content of the register 36 is supplied as address to the port $A_2$ of a dual bank instruction memories $M_{2A}$ and $M_{2B}$. In addition, the content of the register 36 is also supplied as address to a dual bank next instruction memories $M_{3A}$ and $M_{3B}$.

Each of the dual banked instruction memories $M_{2A}$ and $M_{2B}$, and the dual bank next instruction memories $M_{3A}$ and $M_{3B}$ is also switched by the first bank switch $B_1$. Further, each of the memories $M_{2A}$, $M_{2B}$, $M_{3A}$, and $M_{3B}$ is a dual port memory having the notation previously described. Address bus $a_2$ and data bus $d_2$ from the master processor 12 are supplied to the first port $A_1$ and $D_1$ of the memories $M_{2A}$ and $M_{2B}$, respectively. Address bus $a_2$ and data bus $b_3$ are supplied to the first port $A_1$ and $D_1$ of the memories $M_{3A}$ and $M_{3B}$, respectively.

The output of the instruction memories $M_{2A}$ or $M_{2B}$ is supplied to an internal bus 14A. The internal bus is connected through a double registered transceiver 40 to the synchronized communication bus 14. Thus, the output of the instruction memories $M_A$ or $M_{2B}$ is the instruction phase of a microcycle supplied to the bus 14.

At the same time that the instruction from the instruction memory bank $M_{2A}$ or $M_{2B}$ is read out from the port $D_2$, the data from the next instruction address memory bank $M_{3A}$ or $M_{3B}$ is simultaneously read out along its port $D_2$. The data from the next instruction address memory $M_{3A}$ or $M_{3B}$ is stored in register 42. The output of the register 42 is supplied as the other input to the multiplexer 34.

The bank switches B1 and B2 can be toggled on command from the master processor 12, or by an instruction from the instruction memory, or at a preset macrocycle count. The data from the instruction memory $M_{2A}$ or $M_{2B}$ is also supplied to a switch 44 which receives the output of the bank switches B1 and B2 and determines which of the bank switches is selected.

In addition, the data from the instruction memory bank $M_{2A}$ and $M_{2B}$ is supplied to a second multiplexer 46 as one input thereof. The other input to the second multiplexer 46 is from the data output along the port $D_2$ of the next instruction memory bank $M_{3A}$ or $M_{3B}$. Each instruction from the instruction memories $M_{2A}$ or $M_{2B}$ is decoded by a decoder 50. The second multiplexer 46 is switched by the output of the decoder 50.

In an implicit mode of addressing, the next instruction address from the next instruction address memory $M_{3A}$ or $M_{3B}$ is supplied through a delay 52 (which can comprise one or more registers), and is passed through the multiplexer 46 and is stored in the register 48. The output of the register 48 is used as an address to the data memories $M_{4A}$ or $M_{4B}$.

In an explicit mode of addressing, the instruction from the memory $M_{2A}$ or $M_{2B}$ is supplied through a delay 54 (which can comprise one or more registers), and is passed through the multiplexer 46 and is stored in the register 48. The output of the register 48 is used as an address to the data memories $M_{4A}$ or $M_{4B}$.

The delays 52 and 54 serve to delay the addressing of the data memories $M_{4A}$ and $M_{4B}$ so that the memories $M_{4A}$ or $M_{4B}$ will either receive data from the bus 14 or provide data to the bus 14, for the instruction previously provided to the bus 14, in accordance with the format described heretofore.

The output of the register 48 is used as an address to the address port $A_2$ for dual bank data memories $M_{4A}$ and $M_{4B}$. Once again, each memory of the dual bank memories $M_{4A}$ and $M_{4B}$ also has dual ports. The output along the port $D_2$ is determined by bank switch B2 or bank switch B1, as selected by switch SW 44. The output along the data port $D_2$ is supplied to the internal bus 14A, which when passed through the double registered transceiver 40 is supplied to the communication bus 14. Data is also loaded into the data memory banks $M_{4A}$ and $M_{4B}$ through the first port $D_1$ and the address through the first port $A_1$ from the data and address busses 24 and 22 from the master processor 12, respectively.

In the preferred embodiment where the signal processing system 10 is used to process audio signals, the dual bank memories $M_{1A}$, $M_{1B}$, $M_{3A}$, and $M_{3B}$ is a single memory $M_{13}$ operating at twice the speed of the microcycle rate. In addition, the dual bank memories $M_{2A}$ and $M_{2B}$, and memories $M_{4A}$ and $M_{4B}$, are each a single memory $M_2$, and $M_4$, respectively With each memory operating at twice the microcycle rate. In the preferred embodiment, memories $M_1$ and $M_3$ are contained in a $8K \times 16$ SRAM. Memory $M_2$ is a $8K \times 32$ SRAM. Memory $M_4$ is a $8K \times 24$ SRAM. All of the SRAM memories have 35 nsec access time.

The operation of the controller 20 will now be explained with reference to the preferred embodiment wherein the system 10 is used for audio signal processing and a macrocycle is approximately 20 microseconds in duration with a microcycle being approximately 100 nanoseconds in duration. Initially, address and data sufficient for the controller 20 to generate instructions for the bus 14 for 64 macrocycles are loaded into the various memories of the controller 20. As will be seen, due to another aspect of the present invention, less than $64 \times 200$ storage sites are required for all of the instructions.

Let us assume that initially the A bank of the dual bank memories is loaded with the instructions and data. The dispatch table $M_{1A}$ (whose function will be discussed in greater detail hereinafter) is loaded with data.

Instructions for the interface units 16 are stored in the instruction memory $M_{2A}$. The address of the next instruction associated with each instruction, stored in memory $M_{2A}$, are stored in the next address instruction memory $M_{3A}$. The data for the instructions stored in instruction memory $M_{2A}$, which is required to be sent from the controller 20 to the interface units 16, is stored in data memory $M_{4A}$.

If the controller 20 does not drive the bus 14, the default state of the bus 14 is equivalent to an instruction which performs no operation.

At the start of a macrocycle, the macrocycle counter 30 is incremented. The output of the counter 30 is used as an address in the dispatch table $M_{1A}$. The contents of the dispatch table memory $M_{1A}$ is stored in register 32 and is read out and is supplied to the instruction memory $M_{2A}$ and is used as address therefore. The data at the address specified by the dispatch memory $M_{1A}$, is read out through the port $D_2$ and is supplied as an instruction onto the communication bus 14.

Simultaneously, the corresponding next instruction address associated with the instruction just read out along the port $D_2$, is also read out from the next instruction address memory $M_{3A}$. This is supplied to the register 42. Further, where implicit addressing of data memories $M_{4A}$ or $M_{4B}$ is used, the data from $M_{3A}$ or $M_{3B}$ is stored in register 48.

The data from the next instruction address memory $M_{3A}$, as stored in the register 42, is then used as the address for the next instruction from the instruction memory $M_{2A}$. The data stored in the instruction memory $M_{2A}$ is then read out and is then supplied as the instruction to the communication bus 14. Where data is supplied from the controller 20 to the bus 14, The data stored in the register 48 is now used to address the data memory $M_{4A}$. The data at that location is then read out along the port $D_2$ and then supplied to the communication bus 14 as the data associated with the instruction first read out. In this manner each instruction is followed by data (from the controller 20 or any of the interface units 16) with the data associated with the instruction previously transmitted from the controller 20, but not immediately contiguous in time thereto.

Because each instruction stored in the instruction memory bank $M_{2A}$ or $M_{2B}$ has next instruction address associated therewith, the addressing of the next instruction automatically flows from the data from the next instruction address memory $M_{3A}$ or $M_{3B}$. The controller 20 has no program counter or any other sequential counters, except for the macrocycle counter 30. Each instruction automatically "jumps" to the next instruction. Eventually, the last instruction will simply "point" back to itself. Usually, this instruction is a "null operation".

To exit the self-referencing "null" instruction, it is necessary to provide a mechanism to "restart" the instruction memory $M_{2A}$. If no mechanism is provided to "restart" the instruction sequence, the controller 20 would continue to provide "null" instructions to the communication bus 14. The function of the macrocycle counter 30 and the dispatch table memories $M_{1A}$ and $M_{1B}$ is to "restart" a new sequence of instructions from the instruction memory $M_{2A}$.

When a new macrocycle is started, the counter 30 increments. The output of the counter 30 (the six(6) Least Significant Bits in the preferred embodiment) is used as an address to the dispatch table memory $M_{1A}$ and $M_{1B}$. This brings a new data into the register 32.

The new data in register 32 will then be used to locate a new position in the instruction memory $M_{2A}$ which would start the new cycle. The new instruction would then have its associated next instruction address to jump to. In this manner, the dispatch table memories $M_{1A}$ or $M_{1B}$ and the macrocycle counter 30 starts each new macrocycle.

An example of the foregoing operation involving eight microcycles per macrocycle is shown below. The instruction memory $M_{2A}$ is shown with data stored therein and the address for that data. Each data in the instruction memory $M_{2A}$ has associated data for the next instruction address stored in the next instruction memory $M_{3A}$.

| Instr. Mem. | | Next Instr. Mem. |
| --- | --- | --- |
| Add | Data | Data |
| 0000 | A | 0010 |
| 0001 | B | 0011 |
| 0010 | C | 0101 |
| 0011 | D | 0101 |
| 0100 | E | 0010 |
| 0101 | F | 0111 |
| 0110 | G | 1000 |
| 0111 | H | 0110 |
| 1000 | I | 1000 |

The dispatch table memory $M_{1A}$ would have the following data stored with their associated addresses.

| Dispatch Mem | |
| --- | --- |
| Add | Data |
| 0001 | 0000 |
| 0010 | 0001 |
| 0011 | 0100 |
| 0100 | 0010 |

When the macrocycle counter 30 counts 0001 as the first macrocycle, it is used as an address to the dispatch table memory $M_{1A}$. The contents of the dispatch table memory at location of "0001" is the data "0000". That data is used to address instruction memory $M_{2A}$. At the location "0000" in the instruction memory $M_{2A}$ the instruction "A" is then generated and supplied to the communication bus 14. The associated next instruction address contains the data of "0010." This is then used in the next cycle to address the instruction memory $M_{2A}$ at the address of "0010" to bring out the resultant instruction of "C" on the communication bus 14. The data from the next instruction memory $M_{3A}$ associated with the instruction "C" is "0101". This is used to "jump" to the address "0101" in the instruction memory $M_{2A}$. This then brings out the instruction "F". This manner of jumping addresses in the instruction memory $M_{2A}$ based upon the data from the next instruction memory $M_{3A}$ is continued until instruction "I" is read out. As can be seen from the foregoing, instruction "I" is a self-referencing "null" instruction in that once instruction "I" is read out, subsequent instructions will also be instruction "I".

The first four macrocycles (M) started by the data stored in the dispatch table memory $M_{1A}$ would be read out from the instruction memory $M_{2A}$ as follows:

| Macro cycle | microcycles (m) | | | | | | | |
| --- | --- | --- | --- | --- | --- | --- | --- | --- |
| | m1 | m2 | m3 | m4 | m5 | m6 | m7 | m8 |
| M1: | A | C | F | H | G | I | I | I |
| M2: | B | D | F | H | G | I | I | I |
| M3: | E | C | F | H | G | I | I | I |
| M4: | C | F | H | G | I | I | I | I |

As can be seen from the foregoing, with the use of only nine memory locations in the instruction memory $M_{2A}$, 32 instructions over 4 macrocycles are read out. This has an advantage in saving memory space. Further, as can be seen from the foregoing, in macrocycles M1 and M3, only the first microcycle (m1) is changed. (In the first macrocycle M1, the first microcycle (m1) has the instruction A. In the macrocycle M3, the first microcycle (m1) has the instruction E.) This provides the multiplexing of parameters having narrow bandwidth or of signals that are slowly varying, along with parameters that have wider bandwidth. Thus, slowly changing signals can be multiplexed in the same communication channel as fast changing signals. Therefore, the controller 20 of the present invention is capable of providing macrocycles having a plurality of microcycles with any number of instructions in the same microcycle time period in each macrocycle being different. Further, with respect to macrocycles M1 and M3, at least one microcycle in the same time period (e.g., microcycles 2-8) has the same instruction. Therefore, the controller 20 of the present invention is also capable of providing macrocycles having a plurality of microcycles with any number of the same instruction in the same microcycle in each macrocycle.

As previously discussed, the data associated with any instruction may be supplied from the data memory $M_{4A}$ to the bus 14, or from any of the interface units 16 to the bus 14 to any of the other interface units 16 or to the data memory $M_{4A}$ or $M_{4B}$. During the time period in which the controller 20 is supplying 64 macrocycles of instruction data to the bus 14, data associated with the instructions in the 64 macrocycles can be supplied from the data memory bank $M_{4A}$. During that same time period, because the data memory is dual bank, data for the next 64 macrocycles can be supplied by the master processor 12 and is stored in the data memory bank $M_{4B}$. At the end of the 64 macrocycles, the data banks are switched by the bank switch B2. At that time, the data stored in the memory $M_{4A}$ from the bus 14, in the previous 64 macrocycles can be read by the master processor 12.

This mode of operation is termed "synchronous mode". In the synchronous mode, the instructions for the interface units 16 are repeated every 64 macrocycles, although the instructions within each macrocycle can differ in the same microcycle from one macrocycle to another. The instructions provided by the controller 20 during the synchronous mode has the general format of:

M1:   $\ldots I_{(n)a} D_{(n-1)b} I_{(n+1)c} D_{(n)a} \ldots$
M2:   $\ldots I_{(n)d} D_{(n-1)e} I_{(n+1)f} D_{(n)d} \ldots$
          .  .
          .  .
          .  .
M64:  $\ldots I_{(n)g} D_{(n-1)h} I_{(n+1)i} D_{(n)g} \ldots$
M65:  $\ldots I_{(n)a} D_{(n-1)b} I_{(n+1)c} D_{(n)a} \ldots$
M66:  $\ldots I_{(n)d} D_{(n-1)e} I_{(n+1)f} D_{(n)d} \ldots$
          .  .
          .  .

-continued $$M128: \ldots I_{(n)g} D_{(n-1)h} I_{(n+1)i} D_{(n)g} \ldots$$

In the synchronous mode of operation, once the data for the dispatch table memory, the instruction memory, and the next instruction memory are stored in the memories $M_{1A}$, $M_{2A}$, and $M_{3A}$, respectively, they are not thereafter changed. In contrast, the data banks $M_{4A}$ and $M_{4B}$, are switched every 64 macrocycles.

Further, because the instruction set (discussed hereinafter) permits interface-unit 16 to interface-unit 16 communication or interface-unit 16 to controller 20 communication, it is entirely possible that only instructions are sent by the controller 20 to the plurality of interface-units 16, with the data in the data memories $M_{4A}$ and $M_{4B}$ being supplied thereto from the interface units 16. In addition, since the instructions in the various memories $M_1$, $M_2$, and $M_3$, are not changed (in the synchronous mode of operation), the controller 20 can be pre-loaded with instructions, without the need to interface with a master processor 12. This can be done by, for example, using ROM's for the various memories.

The controller 20 of the present invention is also capable of operating in an asynchronous mode. In the asynchronous mode of operation, data for the dispatch table $M_{1A}$ or $M_{1B}$, and the instruction memory $M_{2A}$ or $M_{2B}$, and the next instruction address memory $M_{3A}$ or $M_{3B}$ are stored in the bank which is not currently used to supply the instruction to the communication bus 14. When the dispatch table memory, instruction memory, and next instruction address memory are loaded, the bank switch B1 may be toggled switching the banks.

Because all the instruction memories (dispatch table memory, instruction memory, and next address instruction memory) are dual bank, the instructions can be changed by switching the bank memories at any time synchronous with a time period. This ability to change the instructions "on the fly" means that the communication pattern among the controller 20 and the plurality of interface units 16, can be dynamically reconfigured in real time. Toggling of bank switch B1 turns over control of the communication bus 14 to a new program stored in the bank which was not previously executing the program.

In the preferred embodiment, the instruction supplied from the controller 20 to each of the interface units 16 causes it to perform one of the following actions:

(1) causes data from the bus 14 to be written into a local dual bank, dual port memory 80 which is shared with the slave processor 18; or (2) causes data to be read from the local memory 80 and placed onto the communication bus 14; or (3) executes a control function, e.g., interrupting the slave processor 18; or (4) places status information onto the communication bus 14; or (5) does nothing.

In the preferred embodiment, the instruction set executable by each of the interface units 16 is as follows:

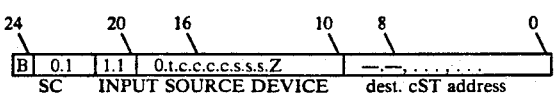

| B | 0.1 | 1.0 | e.e.e.e.e.e.e.e.e.e | —.—,......... |
|---|---|---|---|---|
| SC | | | Master eST address | dest. cST address |

| B | 0.1 | 0.1 | d.d.d.d | | —.—,......... |
|---|---|---|---|---|---|
| SC | | | DSPmodule | | cST address |

| B | 0.1 | 0.0 | a.a.a.a,a.a.a.a,a.a | —.—,......... |
|---|---|---|---|---|
| SC | | | Z module address | dest. cST address |

| 1 | 0.0 | s.s,s.s.s | 0.0.0.0.0.0.0.0,0.0.0.0.0,0.0.0.0 |
|---|---|---|---|
| STB | | MSTR opn | |

| 0 | 0.0 | s.s | A.B.R | z:d.d.d.d,d.d.d.d,d.d.d.d,d.d.d.d |
|---|---|---|---|---|
| STB | | | slave array opn, | set |

| B | 1.1 | 1.1 | t.t.c.c;c.c.s.s.s.Z | e.e.e.e.e.e.e.e.e.e |
|---|---|---|---|---|
| MRD | | | INPUT SOURCE DEVICE | dest. cST address |

| B | 0.1 | 0.1 | d.d.d.d | 0.a.a.a,a.a.a.a,a.a.a.a,a.a.a.a |
|---|---|---|---|---|
| MRD | | | DSPm | DSP RAM absolute address |

| B | 1.1 | 0.1 | d.d.d.d | 1.0.—.—.—.— | —.—,r.r.r.r,r.r.r.r |
|---|---|---|---|---|---|
| MRD | | | DSPm | | cST relative address |

| B | 1.1 | 0.1 | d.d.d.d | 1.1.—.—.—.—.—.—.—, —.—.—.h.h.h.h |
|---|---|---|---|---|
| MRD | | | DSPm | host port or ASIC internal |

| B | 1.1 | 0.0 | a.a.a.a,a.a.a.a,a.a.a.a,a.a.a.a,a.a.a.a |
|---|---|---|---|
| MRD | | | Z module address |

| B | 1.0 | 1.1 | 0.t.c.c;c.c.s.s.s.Z | e.e.e.e.e.e.e.e.e.e |
|---|---|---|---|---|
| MWR | | | OUTPUT DEST. DEVICE | source eST address |

| B | 1.0 | 0.1 | d.d.d.d | 0.a.a.a,a.a.a.a,a.a.a.a,a.a.a.a |
|---|---|---|---|---|
| MWR | | | DSPm | DSP SRAM absolute address |

| B | 0.1 | 0.1 | d.d.d.d | 1.0.—.—.—.— | —.—,r.r.r.r,r.r.r.r |
|---|---|---|---|---|---|
| MWR | | | DSPm | | cST relative address |

| B | 1.0 | 0.1 | d.d.d.d | 1.1.0.0.0.0.0.0.0.0.0.0.h.h.h.h |
|---|---|---|---|---|
| MWR | | | DSPm | host port or ASIC internal |

| B | 1.0 | 0.0 | a.a.a.a,a.a.a.a,a.a.a.a,a.a.a.a,a.a.a.a |
|---|---|---|---|
| MWR | | | Z module address |

The various instructions have the following meaning:

SC- Streamcast, a unit broadcasting data to all other units, excluding itself. The unit can be the slave processor (INPUT SOURCE), master processor (Master), DSP module, or some other special device (e.g. Z module - the address within the Z module is chosen by the address "aaaa . . . ").

STB- Strobe, a special type of command broadcast from the master processor to all slave processors, intended to provide microcycle synchronous control over sets of devices. "ddddd . . . " is the set of selected slave processors.

MRD- Master Read, data is transferred from specific locations to the master processor's data memories (eST)

MWR- Master Write, data is transferred to explicitly specified locations from the master processor's eST memory.

Figure 3:
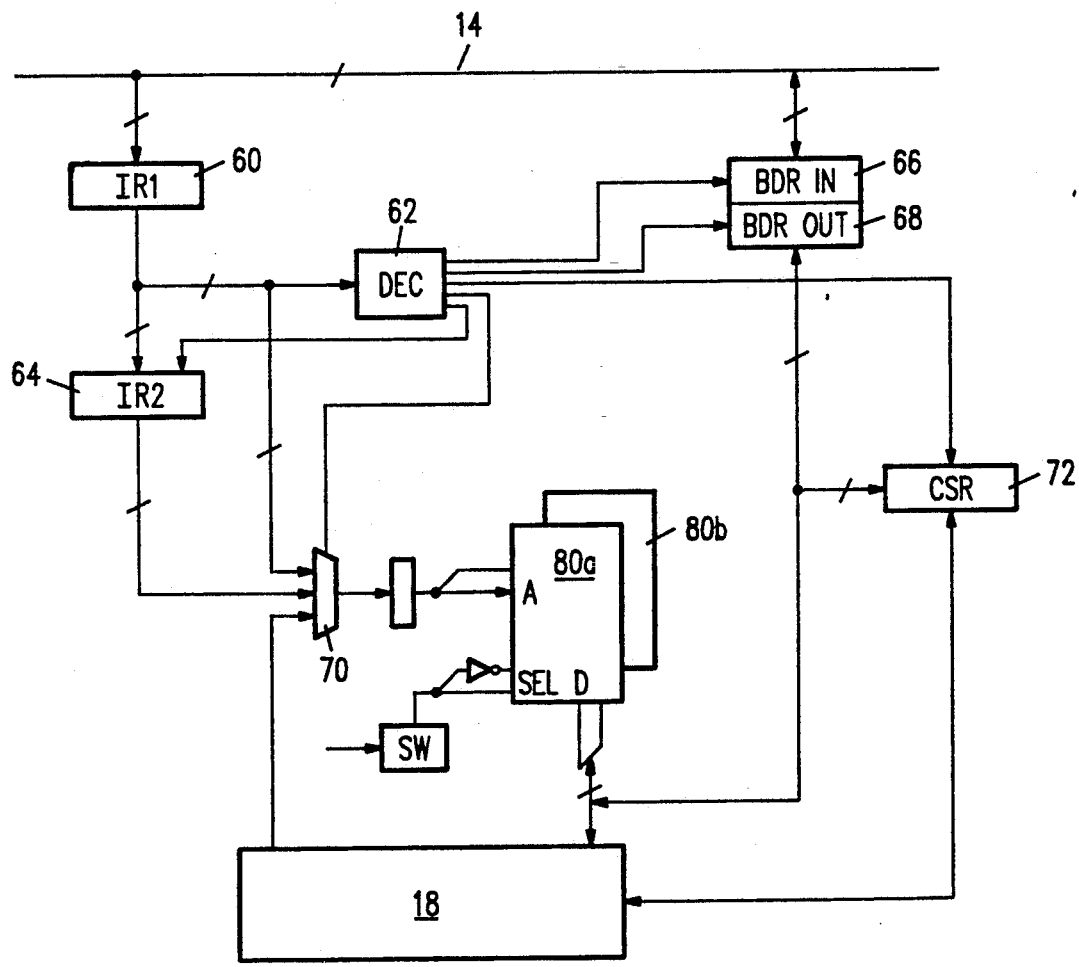
FIG. 3 is a detailed schematic block diagram of the interface unit interconnecting the bus and a slave processor, as shown in FIG. 1.

Referring to FIG. 3 there is shown a detailed schematic drawing of an interface unit 16. The interface unit 16 comprises an IR1 register 60, a decoder and state machine 62, an IR2 register 64, a BDR IN register 66, and a BDR OUT register 68. In addition, the interface units 16 comprises a dual bank local memory 80 (a and b), each of which has dual ports. In the preferred embodiment, the memory 80 (a and b) is a single memory 80 operating at twice the rate of access that the bus 14 would require. Thus, half of its bandwidth is available for operation by a slave processor 18.

In the operation of the interface unit 16, at the end of each instruction phase, first register IR1 latches the instruction $I_n$. The decoder and state machine 62 decodes the operation code and address field stored in IR1 register 60. Since according to the instruction set, previously discussed, the instruction also contains an address field for interface unit 16, if the instruction that is latched into the IR1 register 60 directs this particular interface unit 16 to accept the associated data, the address portion $A_n$, of the instruction $I_n$ would be clocked into the second register IR2 64 at the end of the next instruction (i.e., $I_{n+1}$) phase of the bus 14.

Figure 4A:
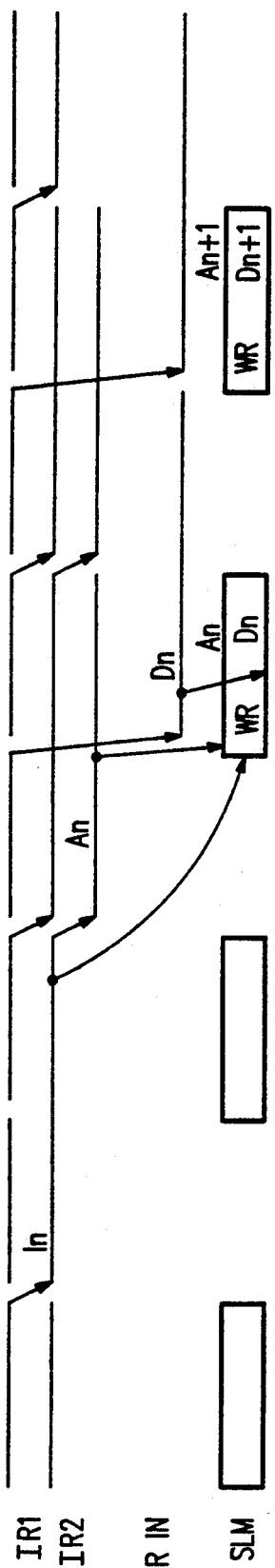
FIGS. 4A and 4B are timing diagrams with FIG. 4A showing the transfer of data from the communication bus to the interface unit, and FIG. 4B showing the transfer of data from the communication bus to the interface unit followed by a transfer of data from the interface unit to the communication bus.

The bus data phase $D_n$ that is associated with the instruction $I_n$ would follow immediately after the instruction $I_{n+1}$. At the end of this data phase the data $D_n$ is clocked into bus data input register BDR IN 66. An operation cycle is started which writes data $D_n$ into the memory 80 at the address $A_n$. As can be seen from the timing diagram shown in FIG. 4A, both antecedent and subsequent bus-to-interface unit operations can proceed without interference.

Figure 4B:
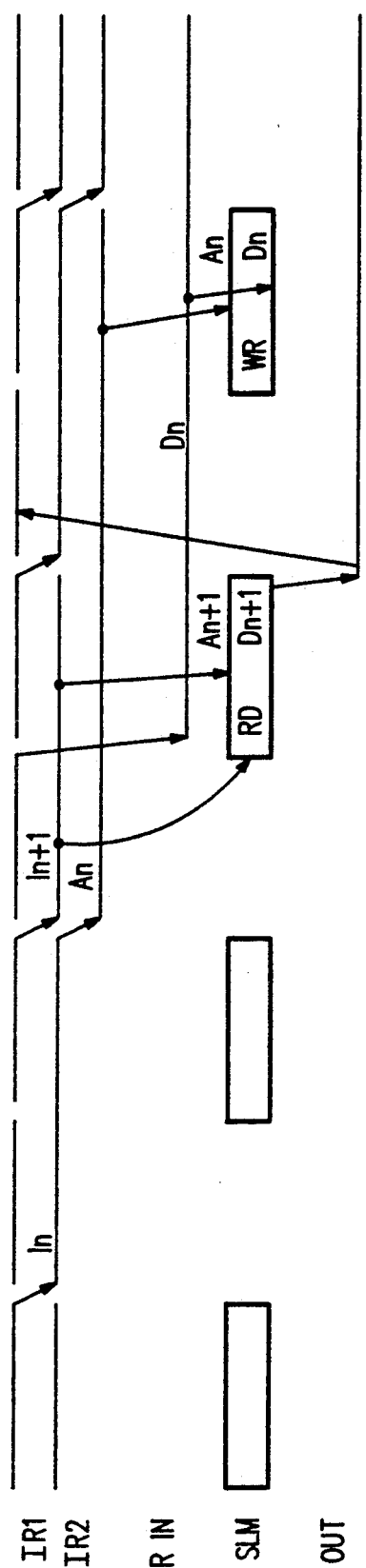

Referring to FIG. 4B there is shown a timing diagram wherein a write instruction of bus to interface unit is followed immediately by a read instruction from interface unit to bus. In FIG. 4B, instruction $I_n$ is a write operation from bus to interface unit, with instruction $I_{n+i}$ directing the interface unit to provide the data $D_{n+1}$ to the bus 14. When register IR1 60 holds the instruction $I_{n+1}$, decoder 62 detects this and causes a slightly different sequence of operations. The pending write operation is suspended, and an immediate read operation accesses $D_{n+1}$ in time for its appearance on the communication bus 14. When IR1 register 60 no longer holds an interface-unit-to-bus type of instruction, the suspended write operation finishes writing data $D_n$ back into the local memory 80 at the address $A_n$.

The multiplexer 70 receives as input thereto the address $A_n$ from IR1 register 60 (for interface unit-to-bus transfer), address from IR2 register 64 (for bus-to-interface unit operation), or address from the slave processor 18. In addition, an optional Command Status Register CSR 72 can be updated or queried by appropriate bus instructions.

The local memory 80 is similar to the dual bank dual ported memories in the controller 20, discussed heretofore. During any microcycle, the bus 14 can access one of the banks, while the slave processor 18 can access the other bank. The slave processor 18 gets its inputs from and writes its outputs to its memory bank 80. The memory banks 80 (a and b) are switched upon command from the controller 20, after updates are completed and the slave processor 18 is ready for new data. in the preferred embodiment, the memory banks 80 (a and b) are switched synchronously at the commencement of every new macrocycle.

The arrival of input data samples external to the system 10 may trigger the exchange of the data banks 80, presenting new data coherently to all the slave processors 18 and initiating parallel processing by all the slave processors 18. Because there is no contention for the shared dual ported memory 80, each slave processor 18 can enjoy a constant access time, enabling real-time performance.

Thus, the sequence of bus activity is triggered by the operation of the controller 20. If it is desireable, generation of complex sequences can be changed "on the fly" thereby implementing a large number of virtual connections under real time control.

There are many advantages to the method and apparatus of the present invention. By means of the dispatch table memory, the instructions for the bus 14, can be different in each macrocycle, with the pattern repeated after $2^n$ macrocycles. However, with the bank switch B1 and the dual bank memories $M_1$, $M_2$, and $M_3$, the instructions can be changed "on-the fly", asychronously. Further, as discussed hereinabove, the communication bus 14 can accommodate high bandwidth as well as slowly changing signals.

In contrast with prior art TDM communication, the communication bus 14 carries both instruction and data. Further, in contrast to a conventional prior art microprocessor bus, the controller 20 directs communication but does not necessarily participate in it. For example, in a single instruction, both the source and the destination may be interface units 16 effecting slave to slave communication. Further, the controller 20's instruction set can include broadcast (one-to-all) and point to point (controller to slave) communication types. The use of broadcast communication instructions conserves bus bandwidth when multiple slave processors require the same input data.

Further, since the address field in the instruction phase can specify the explicit location in each slave processor's memory, the slave's programs or other internal state can be examined and modified by operation of instructions on the bus 14. The bus 14, thus, is not limited to simply operand communication.

Special instructions provide for global synchronization of set wise operations among slave processors: a single instruction can start, halt or interrupt any set of slave processors at once. One such example uses a unary encoding to designate the set of slave processors which is to be affected.

Finally, since the controller 20 is provided with data memory banks, from which it can direct data to the bus 14, it can also capture complete images of the data exchanged on the bus 14 in each macrocycle.

Although the invention has been described with reference to communicating with a plurality of slave processors 18, as used herein the term "slave processor" can be a processor, a DSP module, a storage unit, an input/output device, or any other type of device.

What is claimed is:

1. A digital communication controller for providing a plurality of instructions to a common bidirectional communications bus, said bus having a plurality of slave processors connected thereto with each said slave processor receiving and processing instructions supplied thereto from said common communication bus, and providing data to said common communication bus, in response thereto, said controller comprising:

means for providing a plurality of synchronous and contiguous time periods (each said time period hereinafter referred to as a "microcycle") with each said microcycle having an instruction phase followed by a data phase, said controller connected to said communication bus to provide said plurality of instructions to said bus during the instruction phase of a plurality of said microcycles; and means for sequencing said instruction phase and said data phase within each of said plurality of microcycles wherein in each said microcycle each instruction provided in the instruction phase is followed by data associated with an instruction previously provided in a different one of said microcycles not immediately contiguous in time thereto.

2. The controller of claim 1 wherein said controller interfaces with a master processor, and receives said plurality of instructions therefrom.

3. The controller of claim 2 further comprising:
a first memory means for storing a plurality of stored instructions provided during a plurality of said instruction phases in a first plurality of said contiguous microcycles (hereinafter referred to as a "macrocycle") from said master processor, and for providing said plurality of stored instructions to said communication bus in a second macrocycle;
a second memory means for storing a plurality of stored instructions from said master processor in said second macrocycle, and for providing said plurality of stored instructions to said communication bus in said first macrocycle; and
means for switching the first and second memory means between said first macrocycle and said second macrocycle and said second macrocycle, respectively, immediately upon termination of said first macrocycle.

4. The controller of claim 3 further comprising:
a third memory means for storing data associated with instructions from said master processor provided in a third macrocycle and for providing said stored data to said communication bus in a fourth macrocycle;
a fourth memory means for storing data associated with instructions from said master processor provided in said fourth macrocycle and for providing said stored data to said communication bus in said third macrocycle; and
wherein said switching means switches the third and fourth memory means between said third macrocycle and said fourth macrocycle.

5. The controller of claim 4 wherein said switching of said third and fourth memory means is activated after a plurality of said microcycles by an external signal.

6. The controller of claim 2 further comprising:
a first memory means for storing a first set of stored data provided during a plurality of said data phases in a first plurality of said contiguous microcycles (hereinafter referred to as a "macrocycle") from said master processor and for providing said stored data to said communication bus in a second macrocycle;
a second memory means for storing a second set of stored data from said master processor during said second macrocycle and for providing said stored data to said communication bus in said first macrocycle; and
means for switching said first and second memory means between said first and second macrocycles, immediately upon the termination of said first and said second macrocycle, respectively, macrocycle.

7. The controller of claim 1 wherein said providing means provides said plurality of microcycles in synchronous groups (each synchronous group hereinafter referred to as a "macrocycle") with each said macrocycle having at least one instruction in the same microcycle different.

8. The controller of claim 7 wherein said providing means further comprising:
first memory means for storing the instructions provided in a plurality of said macrocycles, each said instruction stored therein having an address.

9. The controller of claim 8 wherein said providing means further comprising:
second memory means for storing data representative of the address of a sequential one of said instructions in said first memory means, associated with one of said instructions in the first memory means;
means for addressing the first memory means based upon the data from said second memory means.

10. The controller of claim 9 wherein said addressing means addresses said first memory means upon commencement of each said macrocycle.

11. The controller of claim 10 wherein said addressing means further comprising:
counter means for storing a number of macrocycles said elapsed; and
dispatch table means responsive to the number stored in the counter means for generating the address in said first memory means, upon commencement of each said macrocycle.

12. The controller of claim 1 wherein said controller is responsive to one of said instructions broadcast data to all of said slave processors.

13. The controller of claim 1 wherein one of said instructions instructs a broadcast of data from one of said slave processors to all of said other slave processors, and to said controller.

14. The controller of claim 1 wherein one of said instructions instructs a read operation from one of said slave processors to said controller.

15. The controller of claim 1 wherein one of said instructions instructs a write operation from one of said slave processors to said controller.

16. A digital communication system comprising:
a bidirectional common communication bus; and
a controller connected to said bus for providing a plurality of instructions to said bus, said controller comprising;
means for providing said instructions repetitively in a plurality of contiguous groups (each said contiguous group hereinafter referred to as a "macrocycle") with each said macrocycle comprising a plurality of contiguous time periods (each said time period hereinafter referred to as a "microcycle") with each said microcycle having an instruction phase followed by a data phase, with each of said instructions provided in the instruction phase, to said bus wherein in each said microcycle each instruction provided in the instruction phase is followed by data associated with an instruction provided in a different one of said microcycles not immediately contiguous in time thereto; and
means for changing an instruction provided in the same microcycle in one or more of said macrocycles.

17. The system of claim 16 further comprising:
a plurality of interface units connected to said bus;
a plurality of slave processors with each said slave processor connected to said bus through an associated one of said interface units;
said interface unit comprising a dual port memory means for receiving said data from said bus along one port thereof and for providing said data to said slave processor along the other port thereof.

18. The system of claim 17, wherein each of said interface units further comprising:
 means for decoding each of said instructions;
 said dual port memory means having a plurality of buffers; and
 means for switching among said plurality of buffers of said dual port memory means immediately upon the termination of one of said macrocycles.

19. A method of communicating between a master processor and a plurality of slave processors, with each slave processor connected to a bidirectional common communication bus through an interface unit with at least one slave processor receiving and processing instructions supplied thereto from said common communication bus, and providing data to said common communication bus, in response thereto, the method comprising the steps of:
 providing a plurality of instructions in contiguous groups (each contiguous group hereinafter referred to as a "macrocycle") with each macrocycle comprising a plurality of contiguous time periods (each time period hereinafter referred to as a "microcycle") with each microcycle having an instruction phase followed by a data phase, with each of said instructions provided to said bus in an instruction phase;
 sequencing each instruction phase and data phase in each microcycle wherein each instruction in an instruction phase is followed by data associated with an instruction previously transmitted in a different microcycle to immediately contiguous in time thereto; and
 changing the instruction provided in the same microcycle in each contiguous macrocycle.

20. The method of claim 19 wherein said changing step changes an address of the interface unit to which the instruction is directed.

21. The method of claim 19 wherein said changing step changes an operation code of the interface unit to which the instruction is directed.

* * * * *